United States Patent [19]

Saxe

[11] Patent Number: 5,279,773
[45] Date of Patent: Jan. 18, 1994

US005279773A

[54] LIGHT VALVE INCORPORATING A SUSPENSION STABILIZED WITH A BLOCK POLYMER

[75] Inventor: Robert L. Saxe, New York, N.Y.

[73] Assignee: Research Frontiers Incorporated, Woodbury, N.Y.

[21] Appl. No.: 855,266

[22] Filed: Mar. 23, 1992

Related U.S. Application Data

[63] Continuation-in-part of Ser. No. 680,603, Apr. 1, 1991, abandoned, which is a continuation of Ser. No. 216,392, Jul. 7, 1988, abandoned, which is a continuation-in-part of Ser. No. 37,626, Apr. 13, 1987, abandoned, which is a continuation-in-part of Ser. No. 938,396, Dec. 5, 1986, abandoned.

[51] Int. Cl.$^5$ ............................ F21V 9/14; G02B 5/30
[52] U.S. Cl. .................................... 252/585; 252/582; 359/296
[58] Field of Search ................. 252/582, 585; 359/296

[56] References Cited

U.S. PATENT DOCUMENTS

| | | | |
|---|---|---|---|
| 4,164,365 | 8/1979 | Saxe | 359/296 |
| 4,247,175 | 1/1981 | Saxe | 252/585 |
| 4,273,422 | 6/1981 | Saxe | 350/362 |
| 4,285,801 | 8/1981 | Chiang | 350/362 |
| 4,407,565 | 10/1983 | Saxe | 252/585 |
| 4,442,019 | 4/1984 | Marks | 350/362 |
| 4,772,103 | 9/1988 | Saxe | 252/585 |

*Primary Examiner*—Philip Tucker
*Attorney, Agent, or Firm*—Rosenman & Colin

[57] ABSTRACT

A light valve comprises a suspension of particles in a liquid suspending medium that also contains an A-B type block polymer.

24 Claims, No Drawings

LIGHT VALVE INCORPORATING A SUSPENSION STABILIZED WITH A BLOCK POLYMER

The present application is a continuation-in-part of my copending application Ser. No. 680,603, filed Apr. 1, 1991, now abandoned, which in turn was a continuation of application Ser. No. 216,392, filed Jul. 7, 1988, now abandoned, which was a continuation-in-part of application Ser. No. 037,626, filed Apr. 13, 1987, now abandoned, which was a continuation-in-part of application Ser. No. 938,396, filed Dec. 5, 1986, now abandoned, all of which applications are incorporated herein by reference thereto.

The present invention relates to light valves and more particularly to improvements in the liquid suspension of particles contained within the light valve cell.

Light valves have been used for over fifty years for modulation of light. An early example is described in Dr. Edwin Land's U.S. Pat. No. 1,955,923. A conventional light valve may be described as a cell formed of two sheets, at least one of which is transparent, having electrodes thereon usually in the form of transparent conductive coatings. The sheets, which form the wells of the cell, are spaced apart a small distance, and the cell contains a suspension of small particles in a liquid suspending medium. In the absence of an applied electrical field, the particles in the liquid suspension exhibit random Brownian movement, and hence a beam of light passing into the cell is reflected, transmitted or absorbed, depending upon the nature and concentration of the particles and the energy content of the light. When an electric field is applied through the suspension in the light valve, the particles become aligned and for many suspensions most of the light can pass through the cell.

Light valves have been extensively described in the literature. See U.S. Pat. Nos. 1,955,923, 1,963,496, 3,512,876 and 3,773,684. Light valves have been proposed for many purposes including, e.g., alphanumeric displays, television displays, windows, mirrors, eyeglasses and the like to control the amount of light passing therethrough.

A wide variety of inorganic and organic particles have been suggested for use in the light valve, such as mica, aluminum, graphite, metal halides and polyhalides (sometimes referred to in the prior art as perhalides) of alkaloid acid salts. The particles in the liquid suspension may be light-polarizing, such as halogen-containing light polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, N.Y., 1969). If a polyhalide of an alkaloid acid salt is used, the alkaloid moiety is preferably a quinine alkaloid, as defined in Hackh's Chemical Dictionary, supra. U.S. Pat. Nos. 2,178,996 and 2,289,712 refer in detail to the use of polyhalides of quinine alkaloid acid salts and these are useful in the present invention.

Preferably, the quinine alkaloid perhalide is a hydrogenated polyhalide of a quinine alkaloid acid salt, such as dihydrocinchonidine sulfate polyiodide, as described in U.S. Pat. No. 4,131,334, because the material is more environmentally stable than prior art polyhalides of quinine alkaloids.

Alternatively, the particles can be a light-polarizing metal halide or polyhalide, such as cupric bromide or purpureocobaltchloride sulfate polyiodide, as, e.g., in U.S. Pat. No. 1,956,867.

Many types of elongated colloidal metal particles can also be produced and used. For example, U.S. Pat. No. 2,246,087 describes methods for preparing such particles of tellurium, arsenic, bismuth, antimony, silver, platinum and gold.

Also, the particles can be light-polarizing polyhalide particles such as those described in Robert L. Saxe et al application Ser. No. 913,516, filed Sep. 30, 1986, now U.S. Pat. No. 4,877,313, which is incorporated herein by reference thereto.

In general, any type of particle capable of reflecting, absorbing and/or transmitting desired wavelengths of light can be used as the particles in the light valve suspension of the present invention. The shape of the particles used in the light valve suspension should preferably be such that in one orientation they intercept more light than in another orientation. Particles which are needle-shaped, rod-shaped, lath-shaped, or in the form of thin flakes, are suitable. Light-polarizing crystals are especially useful because they produce a pleasing visual appearance.

Numerous liquid suspending media have been proposed for use in light valves for suspending the particles. In general, the liquid suspending medium comprises one or more electrically resistive, chemically inert liquids that will suspend the particles and dissolve the block polymer hereinafter described and any other polymer used to keep the particles in suspension. Liquid suspending media that are known in the art are useful herein, such as the liquid suspending media disclosed in U.S. Pat. No. 4,247,175. Desirably, the liquid suspending medium will maintain the suspended particles in gravitational equilibrium.

A particularly preferred light valve suspension is described in U.S. Pat. No. 4,407,565 based upon the use as the liquid suspending medium of an electrically resistive, chemically inert, low molecular weight liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine. Preferably, the liquid suspending medium also comprises a miscible electrically resistive organic liquid such as, for example, dioctyl adipate, diisodecyl adipate, etc. to provide gravitational equilibrium to the suspended particles and to assist in dispersing the particles in the liquid suspending medium. Other materials useful as the miscible electrically resistive organic liquid are those disclosed in the application of Robert L. Saxe Ser. No. 894,932, filed Aug. 8, 1986, now U.S. Pat. No. 4,772,103, which is incorporated herein by reference thereto. Details concerning the liquid suspending material may be found in U.S. Pat. No. 4,407,565, which is incorporated herein by reference thereto.

To keep the particles in suspension, as described in the present invention, the liquid suspending medium also comprises an A-B type block polymer as hereinafter defined. Nitrocellulose may also be usefully provided in the liquid suspending medium in addition to the block polymer. It is preferred to use just enough of A-B block polymer to maintain the particles in suspension, the amount to be used for a given suspension being empirically determined, as is known. Usually, the amount of the polymer will be from about 1% to about 30%, such as from about 5 to about 25%, by weight, based on the total weight of the suspension.

Block polymers and methods of producing such polymers are described in *Block and Graft Polymers*, William J. Burlant and Allan S. Hoffman, Reinhold Publishing Corporation, New York, 1960; *Block and Graft Polymerization*, Volume 1, edited by R. J. Ceresa, John Wiley & Sons, New York, 1973; and Jakubauskas, *Journal of Coatings Technology*, 58, No. 736, pp. 71–82 (1986).

Block polymers useful in the present invention must satisfy several stringent requirements. They must be soluble in the liquid suspending medium. They must be inert with respect to the suspended particles as well as the liquid medium itself. They must not render the liquid medium too conductive or too viscous. These requirements are satisfied by an A-B type block polymer having a number average molecular weight of from about 10,000 to about 1,000,000, preferably from about 20,000 to about 250,000, wherein the solvating or B-segment of the block polymer is an organic group, preferably a saturated organic group, having sufficient branching to impart solubility to the polymer as a whole in the liquid suspending material, and wherein a second or A-segment anchors the block polymer to the surface of the suspended particles or to another polymer on the surface of the particles. Furthermore, for use in the light valve of the present invention, the anchoring segments of the A-B type block polymer comprise less than about 10%, preferably less than 4%, by weight, of the molecular weight of the polymer. In such A-B type block polymers, the anchoring segment will adsorb or bond to the surface of the particle, while the solvating segment will provide a tail that extends away from the surface of the particle into the liquid suspending medium.

Random copolymers have previously been used in prior art light valve suspensions. Such copolymers have functional groups, such as OH, COOH or other polar groups, randomly distributed among a much greater amount of low polarity solubilizing monomeric groups. However, such random copolymers are inferior to the A-B type block polymers used in the present invention. Thus, a random copolymer can bond to or associate with two or more particles in a light valve suspension forming bridges and connections between particles, as a result of which a particle network linked by such polymer chains is formed rather than a dispersion of separate particles. The polymer bridges or connections are detrimental to the suspension and its performance in a light valve because the viscosity of the suspension is increased by inter-particle polymer tie-ups. This viscosity is reflected in the rise time and decay time of the suspension in a light valve when a voltage is applied or turned off. Typically, using random copolymers and depending on the composition of the suspension, the decay time is 100 ms to several seconds and the rise time about one-third to one-half of the decay time. In contrast to the random copolymers used in the prior art, the A-B type block polymers used in the present invention avoid the formation of the detrimental particle network.

The A-B type polymers used in the present invention comprise a solvating or solubilizing segment and an anchoring segment. In order for the solubilizing segment to dissolve well in the liquid suspending medium, and particularly in the preferred fluorocarbon polymer liquid, a polymeric chain composed of monomeric units having at least one alkyl branch and preferably two or more such branches per repeat unit is present. As a non-limiting example, a polymeric self-ester of 12-hydroxystearic acid, which has one branch per repeat unit, is suitable as the solubilizing component of the A-B type block polymer. More highly branched polymeric solubilizing segments are preferred.

Alternatively, polyesters may be synthesized by reacting suitable diols and diacids or diacid chlorides. A non-limiting example of such a polyester would be the polymer of neopentyl glycol and diethyl malonic acid. This polymer provides two branches per ester linkage in the solubilizing segment. Care must be taken to avoid or minimize production of cyclic esters, or else they should be separated out.

The alkyl branches may themselves be either straight chain or branched and may have from about 1 to about 18 carbon atoms therein, preferably from about 1 to about 6 carbon atoms.

The anchor segment may comprise one or more terminal groups or may be polymeric. The latter increases anchoring bond strength.

An example of an A-B type block polymer having a single terminal group is a self-ester of 12-hydroxystearic acid, with the remaining hydroxy group "capped" by esterifying it with a suitable acid, e.g., 2-ethylhexanoic acid or neopentanoic acid. This procedure produces poly(hydroxystearic acid) with a terminal carboxyl group, the latter serving as an anchoring component. Multiple terminal groups can be introduced, such as by capping the terminal carboxyl group as by forming an ester thereof and then esterifying the terminal hydroxy group with benzene hexacarboxylic acid. Although a terminal carboxyl is preferred to a terminal hydroxyl group, a terminal hydroxyl group can be provided by not capping the terminal hydroxy group and by esterifying the terminal COOH group by reaction with a suitable alcohol, e.g., 2-ethylhexanol or neopentyl alcohol.

Similar capping is employed where a polyester is produced by reacting a diol with a diacid or diacid chloride as described above.

A polymeric anchor group can be obtained by, for example, esterifying the remaining OH or COOH group in the above self-ester with a polymeric component having pendant polar groups such as a self-polymer of a polycarboxylic monohydroxy acid such as a self-polymer of hydroxyglutaric acid, or of a polyhydroxyl monocarboxy acid, for example a self-polymer of dihydroxystearic acid.

The anchor component or segment of the A-B type block polymer can contain functional groups of any type compatible with the particles with which it will be associated. For example, any of the polar groups mentioned in U.S. Pat. No. 3,352,662 as adsorbing well to particles could be used. However, when polyiodide particles and the like are employed in the suspension, the anchor component should not incorporate unhindered quarternary ammonium or amine groups because of deleterious reaction with iodine. Preferred functional groups for incorporation in the anchor component are hydroxy, COOH, $PO_4H_2$, $PO_3H_2$ and groups that can chelate positive ions. Groups that can chelate positive ions include, for example, groups having the following structure:

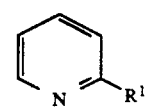

(I)

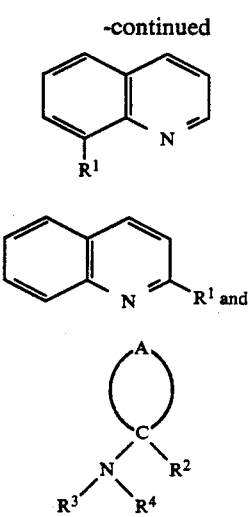

wherein $R^1$ is hydroxy or carboxy, $R^2$ is hydroxy, carboxy or lower alkyl substituted by carboxy or hydroxy, $R^3$ and $R^4$ are independently hydrogen or lower alkyl, and A is alkylene forming with the depicted carbon atom a carbocyclic ring.

A-B type block polymers useful in the present invention are synthesized by known techniques or are commercially available, such as the Hypermer Polymerics of ICI America, Inc. Such polymers were used in Examples 1-3 of the following examples.

In this specification and in the accompanying claims, all parts, proportions and percentages are by weight, unless otherwise stated.

EXAMPLE 1

A suspension of dihydrocinchonidine sulfate polyiodide (DCSI) was prepared in a manner similar to the preparation described in U.S. Pat. No. 4,407,565 Example I except that instead of Halocarbon Oil 1.8/100, type 0.8 Halocarbon Oil was used, and, instead of using the polymers mentioned in Part C thereof (except for Nitrocellulose, which was kept), an A-B type block polymer (Hypermer IL-2209) comprising a polymeric self-ester of 12-hydroxystearic acid as the solubilizing segment having a terminal carboxyl group as the anchor segment was used. The molecular weight of this block polymer was about 2,000 to 3,000 and the terminal group represented less than 4% of the molecular weight of the block polymer. Several tests were conducted using different percentages of the block polymer ranging from 5% to 20% by weight, based on the total weight of the suspension (including the suspended DCSI particles). The block polymer did not cause any adverse chemical reaction with the suspension. When a suspension including 5% of the block polymer was placed in a light valve having an internal gap of 2-mils and activated with a voltage of about 22 volts RMS, a contrast ratio comparable to that of Example I given in U.S. Pat. No. 4,407,565 was achieved, but a much faster decay time of about 50 ms was observed. At 20% concentration of block polymer, the decay time was approximately 200 ms. Rise times were about two to three times as rapid as decay times, as is usual in light valves.

EXAMPLE 2

Example 1 above was repeated but using a different A-B block polymer having a solubilizing segment composed of a self-polymer of 12-hydroxystearic acid and an anchor segment having a terminal quaternary ammonium group therein. The molecular weight of this block polymer was about 2,000 to 3,000 and the terminal group represented less than 4% of the block polymer. Results were comparable to Example 1 except that rise and decay times were about twice as fast and superior stability from agglomeration was achieved. The dark blue suspension became light blue and a voltage about 50% greater than in Example 1 was required to orient the particles. The color and voltage differences are attributed to chemical interaction between the iodine in the particles and the quaternary ammonium groups in the block polymer which caused the suspension to become more conductive than in Example 1. This test indicates, however, that good electric field stabilization can be achieved with such block polymers, and, provided that no adverse chemical reaction occurs, as described above, the A-B block polymers can be expected to substantially reduce the viscosity and decrease the rise and decay times of light valve suspensions.

Any of the previously mentioned types of particles including metal particles, metal halides, other organic polyhalides, etc. can be substituted for DCSI particles in suspensions using the block polymers of the present invention with comparable benefits in connection with lower viscosity and faster rise and decay times.

EXAMPLE 3

A solution comprising 25% solids by weight of Hypermer IL-2209 A-B block polymer dissolved in Halocarbon Oil Type 0.8 was prepared and its electrical resistivity measured. It was approximately $1.9 \times 10^{11}$ ohm-cm. Similar percentage solutions in Halocarbon Oil Type 0.8 of various random copolymers useful in light valve suspensions such as those described in the above-mentioned patents were measured and exhibited electrical resistivities of only approximately $2 \times 10^{10}$ ohm-cm or less. This result clearly indicates that the A-B block polymers of the present invention significantly increase the electrical resistivity of the final suspensions relative to suspensions using random copolymers. Because the resistivity of the final suspension depends on other factors as well, in particular the relative conductivity of particles dispersed therein, the electrical resistivity of a final suspension incorporating the A-B block polymer will generally be at least twice as resistive but can be at least four times as resistive as a similar suspension utilizing random copolymer. Typical DCSI suspensions using random copolymers have an electrical resistivity of about $2-4 \times 10^9$ ohm-cm. Using a suitable block polymer, a resistivity of $4-16 \times 10^9$ ohm-cm or more can be achieved.

EXAMPLE 4

An A-B block polymer was made by the method of H. C. Jakubauskas described in the aforesaid article. The solubilizing component comprised primarily polylauryl methacrylate and the anchor component was formed by reacting mercaptosuccinic acid with isocyanate groups attached to the polylauryl methacrylate chain. This provided a terminal group with four carboxyl groups therein. The molecular weight of the block polymer was about 10,000 and was divided about 90% for the solubilizing component and about 10% for the anchor component. The polymer was not soluble in Halocarbon Oil Type 0.8. When placed in a light valve suspension similar to those in Examples 1 and 2 above, it was not well dissolved because of the presence of some Halocarbon Oil, and consequently only fairly poor stabilization was observed, although suspension viscosity was low and response time excellent.

Superior solubility and stabilization can be achieved, however, by using block polymers having polymerized branched ester monomers such as 3, 5, 5,-trimethylhexyl acrylate or methacrylate, neopentyl acrylate or methacrylate and the like instead of a straight chain esters such as lauryl methacrylate. Also superior solubility and stabilization is achieved by reducing the anchor component to less than 10% of the molecular weight and preferably less than 4% of the molecular weight of the block polymer. Increasing the molecular weight increases the electric field stability of a suspension using the block polymer because of greater steric protection, although higher molecular weight may lower solubility. Reducing the proportion of the anchor component has the additional major advantage of reducing the polarity of the polymer and increasing the electrical resistivity of the suspension. This in turn reduces power requirements.

EXAMPLE 5

Example 4 is repeated but using an A-B block polymer having a B segment comprising 99% neopentyl acrylate and 1% 2-ethylhexyl acrylate and the same A segment as in Example 4. The molecular weight of this block polymer was about 20,000, and it was soluble in Halocarbon Oil. Thus in this instance the A segment had the same molecular weight as in Example 4, about 1,000, but comprised only about 5% of the molecular weight of the block polymer whereas in Example 4 the A segment comprised about 10% of the molecular weight of the block polymer. The solubility of the block polymer of this Example 5 was enhanced relative to the block polymer used in Example 4 by the reduction in the relative percentage of the A segment, as well as by substituting mostly neopentyl acrylate for the lauryl methacrylate in the B segment. As a result of these changes, using 10% by weight of the A-B block polymer, based on the total weight of the suspension, a good particle dispersion was effected. A fast decay time for the suspension of approximately 44 milliseconds was also observed.

Useful block polymers made by the free radical polymerization method of Jakubauskas cited above can be synthesized up to molecular weights of about 30,000. Above approximately that molecular weight too much polymer is produced having no A segment attached instead of the desired A-B block polymer. This problem can be overcome, however, by using other methods of polymerization, e.g., the group transfer process, the general principles of which are described in the literature including, e.g., U.S. Pat. Nos. 4,417,034 and 4,508,880. When the group transfer process is used block polymers having virtually any desired molecular weight can be produced and higher molecular weight A segments can be produced than using free radical polymerization methods.

It is desirable that a polymeric stabilizer used in a light valve suspension be soluble in the liquids used therein in order that the stabilizer occupy a relatively large volume of the suspension in order to provide good steric protection for the particles in suspension. Good solubility for the stabilizer causes its chain and branches to extend and coil well into the liquid and thus occupy a large volume thereof. If a non-solvent for the stabilizer is included in the suspension it will cause the polymer chains to be less well extended, and may even cause them to collapse; in such cases the stabilizer will not function well.

Another way to increase the volume occupied by the polymeric stabilizer in order to improve steric protection is to increase the molecular weight of the stabilizer. Number average molecular weights of 1,000,000 or higher may be employed for stabilizers which are used in light valve suspensions where the relatively high viscosity produced by dissolving a relatively high molecular weight polymeric stabilizer therein can be tolerated. For example, suspensions for use in variable light transmission windows, for which a decay time of several seconds may be acceptable, could employ a high molecular weight polymeric stabilizer.

In cases where one wants the stabilizer to have a relatively high molecular weight but only a moderate to low viscosity one can employ an A-B block polymer whose backbone comprises repeating oxygen linkages, e.g., a polymer comprising a poly(organosiloxane) polymer as the B-segment and either a polymeric or nonpolymeric A-segment comprising polar groups. Such a polymer would have the structure depicted below:

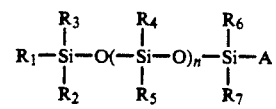

Where $R_1$, $R_2$, $R_3$, $R_4$, $R_6$ and $R_7$ are independently straight or branched chain alkyl having from 1 to 18 carbon atoms; $R_5$ may be straight or branched chain alkyl, aryl, aralkyl or alkylaryl having up to 18 carbon atoms; n is 10 or greater and A is a monomeric or polymeric A-segment (i.e. anchoring segment) comprising some polar groups.

For example, monohydroxy-terminated polydimethyl siloxane can be reacted with a polybasic acid, which optionally may have one or more hydroxyl groups, to form an ester having one or more available polar groups to facilitate bonding. Suitable polybasic acids that can be used for this purpose include phosphoric acid, benzene hexacarboxylic acid, galactaric acid, tartaric acid, citric acid and the like, some of which, after esterification as described above, also include hydroxyl as well as carboxyl groups available to facilitate bonding.

Similarly, a monocarboxy-terminated polydimethyl siloxane polymer can be reacted with a polyhydroxy compound to form an ester having one or more available polar groups to facilitate bonding.

Using group transfer polymerization one can form an A-B block polymer wherein the B-segment comprises poly(dimethyl siloxane) and the A-segment comprises a polymer of any polymerizable monomer having at least one polar group on each monomeric unit, for example a polymer of hydroxyethyl acrylate, hydroxyethyl methacrylate or any other suitable polymerizable monomer comprising acid or hydroxyl groups or alternative polar groups known to the art.

To achieve a high degree of solubility as well as very good steric protection, an A-B block polymer having for its B-segment a poly(dialkyl siloxane) polymer is preferred, and its solubility is especially enhanced if the alkyl groups are branched chain, e.g. 2-ethylhexyl or the like.

The A-B block polymer of the present invention can be used by itself as the polymeric stabilizer if it bonds to the surface of a particle or may be used as a second polymer to bond to a first polymer, e.g., nitrocellulose, which coats the particles.

A blend of two or more different molecular weight A-B block polymers can be advantageous, such as a blend of a low molecular weight A-B block polymer to provide good dispersion and a higher molecular weight A-B block polymer to provide greater steric hindrance to enhance stability against agglomeration in an electric field.

EXAMPLE 6

An A-B block copolymer having a B segment comprising neopentyl methacrylate and an A segment comprising approximately 70 repeat units of hydroxyethyl methacrylate was made by the well known group transfer polymerization method. The number average molecular weight of the polymer was approximately 686,000 and the weight average molecular weight approximately 1.3 million. A suspension of polyiodide particles was prepared by directly reacting a solution of iodine and calcium iodide in the presence of nitrocellulose with pyrazine -2,5-dicarboxylic acid (described in U.S. Pat. No. 5,002,701). The suspension included a viscous plasticizer. The composition of the final suspension was approximately:

| Particles and nitrocellulose | 2.5% |
|---|---|
| Plasticizer | 20.5% |
| Halocarbon Oil, type 0.8 | 72.5% |
| A-B block copolymer | 4.5% |
| | 100.0% |

The suspension was placed in a light valve test cell having an internal gap between its electrodes of 3 mils, and then subjected to 75 volts RMS, i.e., an electric field strength of 25 volts/mil for 66 hours. The suspension was highly stable and exhibited no substantial agglomeration. This is a remarkable achievement for such a high field strength over a prolonged period of time. Furthermore, and most remarkably, the decay time of the suspension was less than 20 milliseconds.

EXAMPLE 7

The experiment of Example 6 was repeated using another A-B block copolymer of similar composition but somewhat higher molecular weight, above 700,000 number average molecular weight, with similar results.

I claim:

1. A light valve comprising a cell containing a suspension of particles of a halogen-containing light-polarizing material in a liquid suspending medium comprising an electrically resistive, chemically inert liquid, said liquid suspending medium having dissolved therein an A-B type block polymer having a number average molecular weight of from about 10,000 to about 1,000,000 and comprising poly(12-hydroxystearic acid) as a solubilizing segment having one terminal group capped with an anchoring segment.

2. A light valve, comprising a cell containing a suspension of particles of a halogen-containing light-polarizing material in a liquid suspending medium comprising an electrically resistive, chemically inert liquid, said liquid suspending medium having dissolved therein an A-B type block polymer having a number average molecular weight of from about 10,000 to about 1,000,000 and comprising a polyorganosiloxane as a solubilizing segment and an anchoring segment comprised of at least one polar group or a group that chelates positive ions, the anchoring segment constituting less than about 10% by weight of said block polymer.

3. The light valve according to claim 2, wherein said liquid comprises a high density halogenated liquid.

4. The light valve according to claim 2, wherein said liquid is a low molecular weight, liquid fluorocarbon polymer having a specific gravity at room temperature of at least about 1.5 and having at least about 50% of its atoms constituted by halogen atoms, at least 60% of said halogen atoms being fluorine and the balance chlorine and/or bromine, and an electrically resistive organic liquid miscible with the fluorocarbon liquid.

5. The light valve according to claim 2, wherein said block polymer has at least one carboxylic acid anchoring group.

6. The light valve according to claim 2, wherein said block polymer has at least one quaternary ammonium anchoring group.

7. The light valve according to claim 2, wherein said anchoring segment comprises at least one group that chelates positive ions.

8. The light valve according to claim 4, wherein said fluorocarbon polymer is selected from the group consisting of low molecular weight homopolymers of chlorotrifluorethylene, bromotrifluoroethylene, and hexafluoropropylene, and polyfluoroalkoxy polymers having a backbone composed of $—CF_2—$ units and pendant $—OC_nF_{2n+1}$ groups, where n is from 1 to 4.

9. The light valve according to claim 2, wherein said fluorocarbon polymer is an oligomer of chlorotrifluoroethylene.

10. The light valve according to claim 9, wherein said oligomer has an initial boiling point in the range of from about 135° C. to about 260° C. and a pour point in the range of from about −70° C. to about −130° C.

11. The light valve according to claim 9, wherein said oligomer has a specific gravity at room temperature of at least about 1.7.

12. The light valve according to claim 9, wherein said oligomer has an initial boiling point in the range of from about 135° C. to about 205° C., a pour point in the range of from about −130° C. to about −93° C. and a specific gravity at room temperature in the range from about 1.6 to about 2.0.

13. The light valve according to claim 8, wherein said fluorocarbon polymer is an oligomer of bromotrichloroethylene.

14. The light valve according to claim 13, wherein said oligomer has a specific gravity at room temperature in the range of from about 2.2 to about 2.4.

15. The light valve according to claim 4, wherein said miscible organic liquid is selected from the group consisting of esters of aliphatic and aromatic acids and alcohols, aliphatic and aromatic hydrocarbons and silicones.

16. The light valve according to claim 4, wherein said miscible liquid is selected from the group consisting of p-nonylphenylacetate, dioctyl adipate, dioctylphthalate, diisodecyl adipate, dioctyl sebacate, benzene, toluene, neopentyl neopentanoate, 3,5,5-trimethylhexyl isobutyrate, 3,5,5-trimethylhexyl neopentanoate, di-2-ethylhexyl ether, di-3,5,5-trimethylhexyl ether and dineopentyl ether.

17. The light valve according to claim 2, wherein said particles are of a light-polarizing polyhalide of a quinine alkaloid acid salt.

18. The light valve according to claim 17, wherein said quinine alkaloid is selected from the group consisting of quinine, cinchonidine, hydrocinchonidine and hydrocinchonine.

19. The light valve according to claim 2, wherein said particles are of dihydrocinchonidine sulfate polyiodide.

20. The light valve according to claim 2, wherein said particles are of quinine bisulfate polyiodide.

21. The light valve according to claim 2, wherein nitrocellulose is dissolved in said liquid suspending medium.

22. The light valve according to claim 2, wherein the A-B type block polymer has the structure

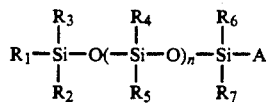

wherein $R_1$, $R_2$, $R_3$, $R_4$, $R_6$ and $R_7$ are independently straight or branched chain alkyl having from 1 to 18 carbon atoms; $R_5$ may be straight or branched chain alkyl, aryl, aralkyl or alkylaryl having up to 18 carbon atoms; n is at least 10 and A is a monomeric or polymeric anchoring segment comprising polar groups.

23. The light valve according to claim 22, wherein the A-B block polymer is an ester of monohydroxy-terminated or monocarboxy-terminated poly(dimethyl siloxane).

24. The light valve according to claim 22, wherein the A-B block polymer is comprised of a B-segment comprising poly(dimethyl siloxane) and an A-segment comprising poly(hydroxyethyl acrylate) or poly(hydroxyethyl methacrylate).

* * * * *